United States Patent
Laye et al.

(10) Patent No.: US 6,303,160 B1
(45) Date of Patent: Oct. 16, 2001

(54) HIGH MOISTURE CREAM CHEESE TEXTURE CONTROL

(75) Inventors: Isabelle Marie-Francoise Laye, Wheeling; Jimbay P. Loh, Greenoaks; David Glenn Pechak, Glen Ellyn; Alice Shen Cha, Northbrook; Bruce Edward Campbell, Glenview; Ted Riley Lindstrom, Lake Forest; Matthew Zwolfer, Chicago, all of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/736,835

(22) Filed: Dec. 14, 2000

(51) Int. Cl.[7] .................................................. A23C 9/12
(52) U.S. Cl. .............................. 426/36; 426/34; 426/38; 426/573; 426/582
(58) Field of Search .............................. 426/34, 36, 38, 426/39, 40, 573, 574, 575, 576, 577, 580, 582, 519, 521, 522

(56) References Cited

U.S. PATENT DOCUMENTS

| | | | |
|---|---|---|---|
| 3,882,250 | 5/1975 | Loter et al. | 426/39 |
| 3,929,892 | 12/1975 | Hynes et al. | 426/582 |
| 3,943,264 | 3/1976 | Davis | 426/330 |
| 4,012,533 | 3/1977 | Jonas | 426/565 |
| 4,066,791 | 1/1978 | Corbin, Jr. | 426/39 |
| 4,199,608 | 4/1980 | Gilmore et al. | 426/570 |
| 4,244,983 | 1/1981 | Baker | 426/582 |
| 4,312,891 | 1/1982 | Eisfeldt | 426/573 |
| 4,324,804 | 4/1982 | Davis | 426/36 |
| 4,341,801 | 7/1982 | Weissman | 426/40 |
| 4,352,826 | 10/1982 | Pearline et al. | 426/39 |
| 4,379,175 | 4/1983 | Baker | 426/582 |
| 4,534,982 | 8/1985 | Yoshida et al. | 426/36 |
| 4,597,971 | 7/1986 | Davis | 426/36 |
| 4,678,673 | 7/1987 | Marshall et al. | 426/46 |
| 4,684,533 | 8/1987 | Kratochvil | 426/575 |
| 4,724,152 | 2/1988 | Baker et al. | 426/335 |
| 4,859,484 | 8/1989 | Bielskis et al. | 426/573 |
| 4,968,512 | 11/1990 | Kharrazi | 426/40 |
| 5,063,073 | 11/1991 | Kratochvil | 426/573 |
| 5,079,024 | 1/1992 | Crane | 426/573 |
| 5,108,773 | 4/1992 | Smith et al. | 426/582 |
| 5,180,604 | 1/1993 | Crane et al. | 426/582 |
| 5,252,352 | 10/1993 | Banach et al. | 426/580 |
| 5,656,320 | 8/1997 | Cheng et al. | 426/582 |
| 5,676,984 | 10/1997 | Bohanan et al. | 426/34 |
| 5,679,395 | 10/1997 | Finocchiaro | 426/582 |
| 5,882,704 | * 3/1999 | Yamaguchi et al. | 426/36 |
| 6,096,352 | * 8/2000 | Kijowski et al. | 426/36 |

* cited by examiner

Primary Examiner—Leslie Wong
(74) Attorney, Agent, or Firm—Fitch, Even, Tabin, & Flannery

(57) ABSTRACT

A process for producing a high moisture cream cheese having desirable textural characteristics (i.e., increased firmness) is provided. More specifically, the process of the invention provides a high moisture cream cheese with significantly increased firmness by controlling the moisture levels during the manufacturing process at levels below the final target moisture level of the final cream cheese product; the moisture level of the final composition is then adjusted to the final target moisture level by the addition of water. It has surprisingly been found that control of the moisture levels during the manufacturing process in this manner results in-significantly increased levels of firmness in the final cream cheese product. Indeed, the firmness of the high moisture cream cheese product produced using this method is about 5 to about 20 fold greater than standard cream cheese prepared without such moisture control.

20 Claims, 2 Drawing Sheets

HIGH MOISTURE CREAM CHEESE TEXTURE CONTROL

FIELD OF INVENTION

The present invention is directed to a process for producing a high moisture cream cheese having desirable textural characteristics (i.e., increased firmness). More specifically, the process of the invention provides a high moisture cream cheese with significantly increased firmness. In the present process, moisture levels during the manufacturing process are maintained at levels below the final target moisture level of the final cream cheese product; the moisture level of the final composition is then adjusted to the final target moisture level by the addition of water. It has surprisingly been found that control of the moisture levels during the manufacturing process in this manner results in significantly increased levels of firmness in the final cream cheese product.

BACKGROUND

Cream cheese is a soft, mild acid-coagulated uncured cheese made from a mixture of cream and milk. Cream cheese is stored under refrigeration conditions and the body of cream cheese is smooth and butter-like. The texture and cream cheese body at refrigeration temperatures is such that the cream cheese can be sliced and spread. In making cream cheese, uncultured whole milk and/or skim milk and sweet cream are blended in pre-selected proportions to form a cream cheese mix. The cream cheese mix normally has a butterfat content of from about 10 to about 20 percent. After processing, the finished cream cheese has a butterfat content of from about 33 to about 35 percent by weight.

The cream cheese mix is pasteurized and homogenized after which it is cooled, usually to a temperature between 62 and 92° F., and is then inoculated with a lactic acid culture. The mix is held at the inoculation temperature until it has ripened and formed a coagulum. The acidity of the coagulum is from about 0.6 to about 0.9 percent (calculated as percent equivalent lactic acid). After the desired acidity is obtained, the curd is separated from the whey and is thereafter packaged. One well known process for making cream cheese and separating cream cheese curd from whey includes a mechanical separation of the curd. This process is disclosed in U.S. Pat. No. 2,387,276 to Link. In accordance with this method, after ripening to form a coagulum, the coagulum is heated to an elevated temperature to break the viscosity of the mix. Thereafter, the heated mix is centrifuged at the elevated temperature to separate the curd from the whey. Processes that result in the production of whey increase production costs as the whey must be separated and disposed or otherwise treated.

Considerable efforts have been made to produce a high moisture cream cheese with significantly reduced protein and fat levels. However, increasing moisture levels in the cream cheese will often result in a cream cheese product that does not have a desired firmness. The present invention provides a high moisture cream cheese having the desired degree of firmness.

SUMMARY

The present invention is directed to a process for producing a high moisture cream cheese with increased firmness. Moreover, the present invention provides a process for the production of a high moisture cream cheese that does not include a whey separation step. In accordance with the present invention, cream cheese components are pasteurized and homogenized at moisture levels below target moisture levels of the final cream cheese. Moisture levels of the resulting product are then adjusted to the final target levels to provide a final high moisture cream cheese product. The process of the invention provides a curd firmness of about 5 to about 20 times greater than curd produced in a process having essentially constant moisture levels throughout the manufacturing process. In another aspect, the process of the invention provides high moisture products with less protein and, in particular, less casein. Whey protein is a less expensive source of protein than casein. In an important aspect, the process does not include a whey separation step, thereby reducing manufacturing costs.

The present invention provides a process for the production of high moisture, firm cream cheese. The present process comprises blending a non-fat cultured milk mixture, a milk fat emulsion, gum, and salt at a temperature of about 130 to about 150° F. for about 5 to about 10 minutes. In an important aspect of the invention, the non-fat cultured milk mixture, milk fat emulsion, gum, and salt blend has a moisture content of at least about 2 percent lower than the moisture content in the final high moisture cream cheese product. In the next step of the process of this invention, the blend is homogenized at a temperature of about 130 to about 150° F. at about 500 to about 4000 psi. In another important aspect of the invention, the moisture content during homogenizing is at least about 2 percent lower than the moisture content in the final high moisture cream cheese product. After homogenization, additional water is blended with the homogenized blend to provide a cream cheese with a moisture content of at least about 68 percent and having a firmness of about 5 to about 20 fold greater than a cream cheese produced in a process having essentially constant moisture levels. The high moisture cream cheese produced in accordance with the claimed invention has a protein content of from about 5 to about 10 percent.

The present invention also provides a process for the production of high moisture cream cheese having a predetermined target moisture content, said process comprising:

blending a non-fat cultured mix component having a casein to whey ratio of less than about 75:25, an emulsion component, and a salt/gum component at a temperature of about 130 to about 150° F. for about 5 to about 10 minutes to form a blend, wherein the blend has a moisture content less than the predetermined target moisture content;

homogenizing the blend at a temperature of about 130 to about 150° F. at about 500 to about 4000 psi to form a homogenized blend, wherein the homogenized blend has a moisture content less than the predetermined target moisture content; and blending additional water with the homogenized blend to raise the moisture content to the predetermined target moisture level, thereby providing the high moisture cream cheese, wherein the high moisture cream cheese has a significantly higher firmness than a standard cream cheese produced in a similar process but wherein the blend or the homogenized blend have moisture levels approaching or equal to the predetermined target moisture content.

The present invention also provides a process for the production of high moisture cream cheese having a predetermined target moisture content, said process comprising:

(1) preparing a non-fat cultured mix component by a process comprising:

(A) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of less than about 75 to 25;
(B) pasteurizing the substrate;
(C) cooling the pasteurized substrate to a temperature of about 70 to about 80° F.; and
(D) culturing the cooled pasteurized substrate with a cream cheese culture at a temperature of about 65 to about 85° F. for about 10 to about 20 hours to achieve a pH of about 4.4 to 4.9 to obtain the non-fat cultured mix component;

(2) preparing an emulsion component by a process comprising:
(A) blending whey protein concentrate with water to form a whey protein concentrate and water blend;
(B) adding a melted fat to the whey protein concentrate and water blend to form a melted fat, whey protein concentrate, and water blend containing about 4 to about 6 percent whey protein concentrate, about 45 to about 55 percent fat, and about 45 to about 50 percent water;
(C) treating the melted fat, whey protein concentrate, and water blend under low shear conditions to form a coarse emulsion with a mean fat droplet diameter of about 5 to about 20 microns; and
(D) treating the coarse emulsion under high shear to form a second emulsion with a mean fat droplet diameter of about 1 to about 5 microns, wherein the second emulsion is the emulsion component;

(3) preparing a salt/gum component comprising dry mix of about 60 to about 80 percent salt and about 20 to about 40 percent gum;

(4) blending the non-fat cultured mix component, the emulsion component, and the salt/gum component at a temperature of about 140 to about 180° F. for about 1 to about 10 minutes to form a blend, wherein the blend has a moisture content less than the predetermined target moisture content;
homogenizing the blend at a temperature of about 130 to about 180° F. at about 1000 to about 4000 psi to form a homogenized blend, wherein the homogenized blend has a moisture content less than the predetermined target moisture content; and
blending additional water with the homogenized blend to raise the moisture content to the predetermined target moisture level, thereby providing the high moisture cream cheese,
wherein the high moisture cream cheese has a significantly higher firmness than a standard cream cheese produced in a similar process but wherein the blend or the homogenized blend have moisture levels approaching or equal to the predetermined target moisture content.

The present invention also provides a high moisture cream cheese having a predetermined target moisture content, said high moisture cream cheese be prepared by a process comprising:
blending a non-fat cultured mix component having a casein to whey ratio of less than about 75:25, an emulsion component, and a salt/gum component at a temperature of about 140 to about 180° F. for about 1 to about 10 minutes to form a blend, wherein the blend has a moisture content less than the predetermined target moisture content;
homogenizing the blend at a temperature of about 130 to about 180° F. at about 1000 to about 4000 psi to form a homogenized blend, wherein the homogenized blend has a moisture content less than the predetermined target moisture content; and
blending additional water with the homogenized blend to raise the moisture content to the predetermined target moisture level, thereby providing the high moisture cream cheese,
wherein the high moisture cream cheese has a significantly higher firmness than a standard cream cheese produced in a similar process but wherein the blend or the homogenized blend have moisture levels approaching or equal to the predetermined target moisture content.

The present invention also provides a high moisture cream cheese having a predetermined target moisture content, said high moisture cream cheese being prepared by a process comprising:

(1) preparing a non-fat cultured mix component by a process comprising:
(A) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of less than about 75 to 25;
(B) pasteurizing the substrate;
(C) cooling the pasteurized substrate to a temperature of about 70 to about 80° F.; and
(D) culturing the cooled pasteurized substrate with a cream cheese culture at a temperature of about 65 to about 85° F. for about 10 to about 20 hours to achieve a pH of about 4.4 to 4.9 to obtain the non-fat cultured mix component;

(2) preparing an emulsion component by a process comprising:
(A) blending whey protein concentrate with water to form a whey protein concentrate and water blend;
(B) adding a melted fat to the whey protein concentrate and water blend to form a melted fat, whey protein concentrate, and water blend containing about 4 to about 6 percent whey protein concentrate, about 45 to about 55 percent fat, and about 45 to about 50 percent water;
(C) treating the melted fat, whey protein concentrate, and water blend under low shear conditions to form a coarse emulsion with a mean fat droplet diameter of about 5 to about 20 microns; and
(D) treating the coarse emulsion under high shear to form a second emulsion with a mean fat droplet diameter of about 1 to about 5 microns, wherein the second emulsion is the emulsion component;

(3) preparing a salt/gum component comprising dry mix of about 60 to about 80 percent salt and about 20 to about 40 percent gum;

(4) blending the non-fat cultured mix component, the emulsion component, and the salt/gum component at a temperature of about 140 to about 180° F. for about 1 to about 10 minutes to form a blend, wherein the blend has a moisture content less than the predetermined target moisture content,
homogenizing the blend at a temperature of about 130 to about 180° F. at about 1000 to about 4000 psi to form a homogenized blend, wherein the homogenized blend has a moisture content less than the predetermined target moisture content; and blending additional water with the homogenized blend to raise the moisture content to the predetermined target moisture level, thereby providing the high moisture cream cheese, wherein the high moisture cream cheese has a significantly higher firmness than a standard cream cheese produced in a similar process but wherein the blend or the homogenized blend have moisture levels approaching or equal to the predetermined target moisture content.

DETAILED DESCRIPTION OF THE PREFERRED EMBODIMENTS

The present invention is directed to a process for producing a high moisture cream cheese with increased firmness. In accordance with the present invention, cream cheese components are homogenized and cooked at moisture levels below the predetermined target moisture level of the desired final cream cheese. The moisture level of the resulting homogenized and cooked product is then adjusted to the predetermined target level to provide the final high moisture cream cheese product. It has surprisingly been found that control of the moisture content during the manufacturing process in this manner results in significantly increased levels of firmness in the final cream cheese product.

In an important aspect, the process of the invention provides a curd firmness of about 4 to about 20 fold greater than curd produced in a process wherein the moisture levels are maintained at or near the predetermined target moisture level throughout the manufacturing process. In other words, by adjusting the moisture level below the predetermined target level during the manufacturing process and only standardizing the moisture level to the predetermined target level at the end of the manufacturing process allows for a significant increase in the firmness of the resulting cream cheese. Additionally, the present process does not generate whey, thereby reducing manufacturing costs.

Overall, the present process provides a blend of (1) a non-fat cultured mix component, (2) an emulsion component, and (3) a salt/gum component (preferably a dry mixture of a gum and salt) which is homogenized under high shear conditions and then cooked at a temperature of 150 to about 190° F. for 5 to about 30 minutes. Preferably, homogenization is carried out in a two-stage homogenizer wherein the first stage is operated at a pressure of about 1000 to about 3000 psi and the second stage is operated at a pressure of about 100 to about 500 psi. The moisture level of the blend is below the desired or predetermined target level of the final cream cheese. After the homogenization step and/or during the cooking step, sufficient water is added to bring the moisture level of the resulting cream cheese up to the desired or predetermined target level of the final cream cheese. Using the process of the present invention, a cream cheese with a significantly increased firmness can be produced as compared with a similar cream cheese prepared in a similar process except that the moisture is standardized or adjusted to the predetermined target level prior to the final homogenization step. Generally, a cream cheese having a yield stress of about 1500 to about 3500 Pascals, and more preferably, about 2000 to about 2500 Pascals, can be obtained.

Figure 1:
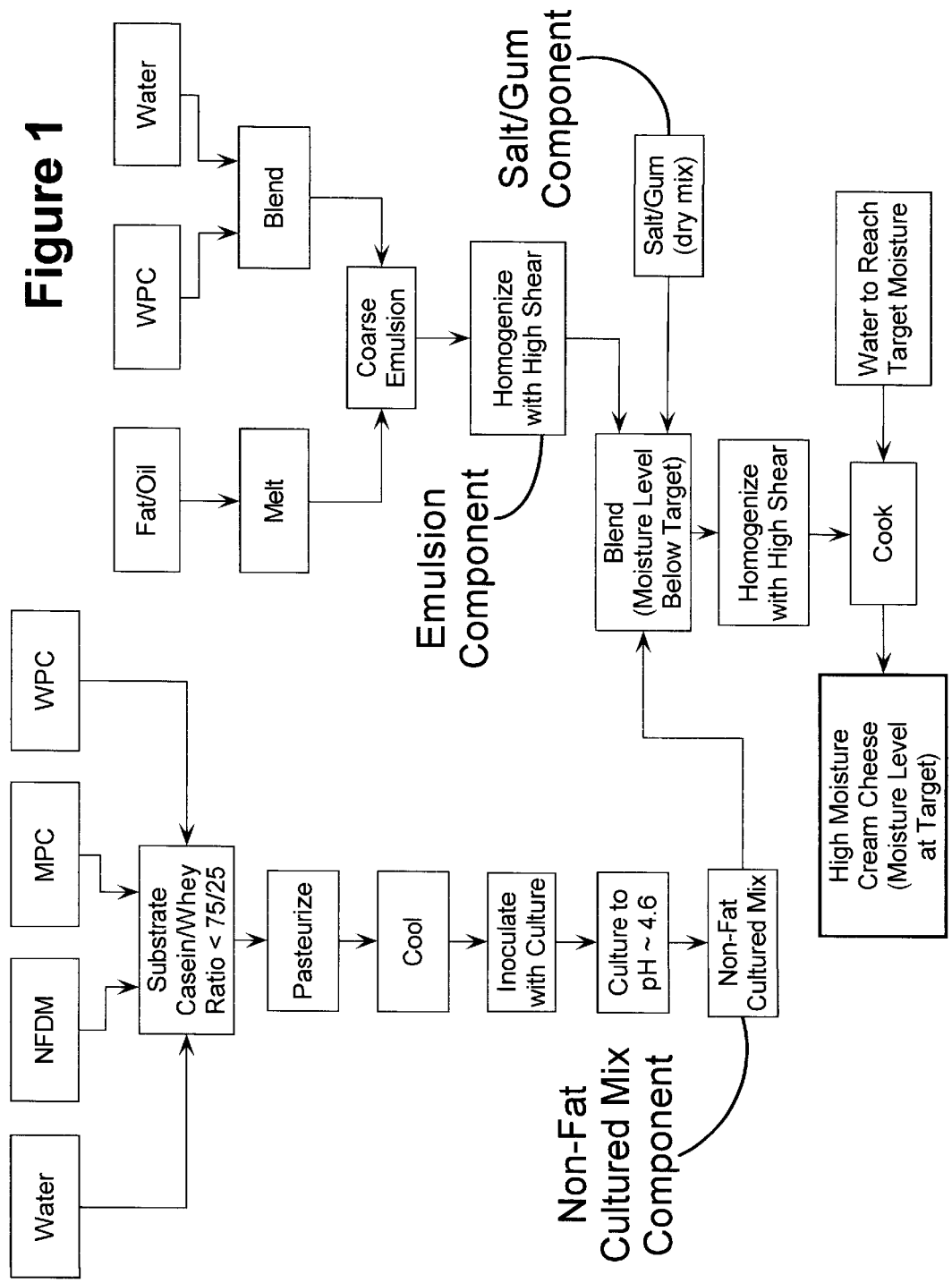
FIG. 1 provides a general flow chart illustrating the process of the present invention.

The present invention is generally illustrated in FIG. 1 for preparing a high moisture cream cheese having a predetermined moisture level. For purposes of this invention, the predetermined moisture level of the final high moisture cream cheese is about 65 to about 75 percent and, more preferably, about 68 to about 70 percent.

The non-fat cultured mix component is prepared by blending water, non-fat dry milk, milk protein concentrate (MPC), and whey protein concentrate (WPC) to form a substrate, such that the substrate has a casein/whey ratio of less than about 75/25, and preferably about 40/60 to about 75/25. Addition of the whey protein concentrate to form the substrate allows control of the casein/whey ratio and allows more of the protein to be acidified by the culture such that the whey protein concentrate added through the emulsion component at pH 6.5 will not bring the final pH of the resulting cream cheese above about 5. Using this formulation, final pH is generally in range of about 4.8 to about 4.9.

Generally the substrate contains 0 to about 4 percent non-fat dry milk, about 6 to about 9 percent milk protein concentrate, about 1 to about 4 percent whey protein substrate, and about 80 to about 90 percent water. More preferably, the substrate contains about 3 to about 4 percent non-fat dry milk, about 6 to about 7 percent milk protein concentrate, about 2 to about 3 percent whey protein substrate, and about 80 to about 90 percent water. Suitable milk protein powders are commercially available; examples of such milk protein powders include, but are not limited to, ALAPRO 4850 (MPC85), ALAPRO 4700 (MPC70), ALAPRO 4560 (MPC56), ALAPRO 4420 (MPC42), from New Zealand Milk Products, Inc. (Petaluma, Calif.), and MPC80, MPC56, and MPC42 from Murray Goulburn (Australia); mixtures can also be used if desired. Suitable whey protein concentrates are commercially available; examples of such whey protein powders include, but are not limited to, AMP8000 (AMPC Ames, Iowa), FDA35 (Fieldgate, Litchfield, Minn.), and Alacen 895 (New Zealand Milk Products, Inc.; Petaluma, Calif.); mixtures can also be used if desired. Preferably, the whey protein concentrates contain native proteins which are minimally denatured.

The substrate is then pasteurized using conventional techniques in order to "clean up" the substrate prior to culturing. Generally, the pasteurization is carried out at a temperature of about 150 to about 180° F. for about 15 seconds to about 5 minutes. After cooling to about 70 to about 80° F., the substrate is inoculated with a conventional cream cheese culture and then cultured using conventional techniques to achieve a pH of about 4.4 to about 5, and preferably about 4.5 to about 4.6. Examples of suitable cream cheese cultures include, but are not limited to, CNH11 (Christian Hansen, Milwaukee, Wis.), CHN12 (Christian Hansen, Milwaukee, Wis.), or other lactic culture systems; the preferred cream cheese culture for use in the present invention is CHN12. Typically, the substrate is cultured at a temperature of about 65 to about 85° F. for about 10 to about 30 hours, preferably at about 70 to about 74° F. for about 18 to about 24 hours. The non-fat cultured mix component is obtained after culturing. Typically, the non-fat cultured mix component will contain about 87 percent moisture, about 0.25 percent fat, about 8 percent protein, and about 3 percent lactose. Generally, the non-fat cultured mix has gel-like characteristics; it can, however, easily be pumped.

The emulsion component is prepared by first blending a whey protein concentrate with water in a suitable mixer. The whey protein concentrate acts as an emulsifier. Melted fat (preferably butter fat at a temperature of about 130° F.) is then added to the water/emulsifier blend under low shear conditions to form a course emulsion (typical mean fat droplet diameter of about 5 to about 20 microns). Preferably, low shear homogenization is carried out using agitation (e.g., mixer or blender). Other fats which can be used include, but are not limited to, anhydrous milk fat, concentrated milk fat, cream, vegetable fats, and the like. The course emulsion typically contains about 4 to about 6 percent whey protein concentrate, about 45 to about 55 percent fat, and about 45 to about 50 percent water. More preferably, the course emulsion contains about 5 to about 5.5 percent whey protein concentrate, about 46 to about 48 percent fat, and about 46 to about 48 percent water. The coarse emulsion is then homogenized under high shear conditions to form a fine emulsion with a typical mean particle size of about 1.5 to 5 microns. Preferably, homogenization to produce this fine emulsion is carried out in a two-stage homogenizer wherein the first stage is operated at a pressure of about 1000 to about 3000 psi and the second stage is operated at a pressure of about 100 to about 500 psi. This fine emulsion is the emulsion component. Typically, the emulsion component will contain about 55 percent moisture, about 39 percent fat, about 5 percent protein, and about 1.1 percent lactose; preferably, there is essentially no casein added to the emulsion component.

The salt/gum component is preferably prepared by dry blending suitable amounts of salt and gum without any added water. Generally, the salt/gum component will contain about 60 to about 80 percent salt and about 20 to about 40 percent gum, depending on the desired concentrations of salt and gum in the final cream cheese. Gums normally used in cream cheese manufacture can be used in the present invention. Examples of suitable gums include carob, guar, xanthan, carrageenan, and the like; generally, carob gum is preferred.

The non-fat cultured mix component and the emulsion component are then blended together. The gum/salt component, preferably at a temperature of about 130 to about 150° F., is then added to the non-fat cultured mix component and emulsion component blend to form the overall blend. The amount of the gum/salt component added is determined by the desired amount of salt and gum in the final cream cheese product. Blending of the gum/salt component at this stage is significantly easier using a dry blend (as opposed to a water dispersion); thus, dry blend are preferred. If desired, the non-fat cultured mix component and the emulsion component blend can be pasteurized using conventional pasteurized techniques prior to the addition of the gum/salt component. This overall blend generally comprises about 40 to about 45 percent of the non-fat cultured mix component, about 60 to about 65 percent of the emulsion component, and about 0.5 to about 1.5 percent of the salt/gum component. The overall blend is then homogenized under high shear conditions at about 150 to about 190° F. to form a fine emulsion (mean fat droplet diameter of about 1.5 to 5 microns). Preferably, this homogenization step is carried out in a two-stage homogenizer with a first stage at about 1000 to about 4000 psi and a second stage at about 100 to about 500 psi. This homogenization step is important to obtain the desired texture.

The critical feature of the overall blend is that its overall moisture content is below the predetermined target moisture level of the final cream cheese product. Of course, the overall moisture content of this overall blend DOCKET NO. 66636 is controlled by the amounts of moisture in the non-fat cultured mix component, the emulsion component, and the salt/gum component and the relative amounts of the three components in the overall blend. (As just noted, the salt/gum component preferably contains no moisture; thus, the moisture content of the overall blend is more generally controlled by the moisture contents of the other two components and their relative amounts. If, however, the salt/gum component contains moisture, such moisture must be taken into account.) Generally, the overall moisture content of this overall blend is about 2 to about 6 percent lower, and more preferably about 3 to about 4 percent lower, than the predetermined target level of the final high moisture cream cheese product After the homogenization step, the homogenized mixture is preferably heated to about 180 to about 190° F. to assist in hydrating the gum. Additional water is added to bring the final moisture content up to the predetermined target value. Preferably, the additional water is added at a temperature of about 180 to about 190° F. The mixture is then cooked at about 180 to about 200° F. for up to about 30 minutes, more preferably at about 180 to about 190° F. for about 5 to about 15 minutes, to produce the high moisture cream cheese of the present invention. The resulting high moisture cream cheese can be packaged using conventional techniques and procedures. Preferably, the resulting high moisture cream cheese is hot packed in suitable container (e.g., tubs) and then cooled to a temperature of about 40 to about 50° F. As the product cools, it obtains approximately 80 to 90 percent of its peak two week viscosity within the first three days.

Typically, the high moisture cream cheese product of the present invention has a moisture content of about 65 to about 70 percent, a fat content of about 20 to about 25 percent, a casein content of about 1.5 to about 2.5 percent, a whey protein content of about 3 to about 4.5 percent, and a lactose content of about 2 to about 6 percent. More preferably, the high moisture cream cheese product of the present invention has a moisture content of about 68 to about 69 percent, a fat content of about 21 to about 23 percent, a casein content of about 1.8 to about 2 percent, a whey protein content of about 4 to about 4.5 percent, and a lactose content of about 2 to about 6 percent. Typically, the high moisture cream cheese of the present invention has a yield stress, as measured by a Vane Rheometer, of about 1500 to about 3500 Pascals, and more preferably, about 2000 to about 2500 Pascals. This increase in firmness generally represent about 4 to about 20 fold increase as compare to cream cheese prepared with controlling the moisture as described herein.

The following examples are intended to illustrate the invention and not to limit it. Unless otherwise indicated, all percentages and ratio are by weight.

Example 1

A cream cheese was prepared using a non-fat culture mixture, an emulsion, and a salt/gum mixture using the inventive procedure. This procedure is basically as described in FIG. 1. The target moisture level for the resulting cream cheese was about 68 percent. The following formulations were used:

| Ingredient | Weight (lbs) |
| --- | --- |
| Non-fat culture mixture: | |
| Water | 92.5 |
| NFDM | 4.2 |
| Alapro 4700 | 7.3 |

| Ingredient | Weight (lbs) |
|---|---|
| AMP8000 | 2.5 |
| Emulsion: | |
| Concentrated Milk Fat | 40.6 |
| AMP8000 | 4.5 |
| Water | 31.8 |
| Salt/Gum Mixture: | |
| Salt | 0.74 |
| Carob | 0.32 |

The ingredients for the non-fat culture mixture were blended in a suitable mixer (e.g., Breddo) at about 140 to about 150° F. and batch pasteurized for about 5 minutes at about 178° F. After cooling, the mixture was inoculated with a Chr. Hansen culture (CHN12) at about 72° F. After approximately 18 hours, the fermentate (i.e., the non-fat culture mixture) is collected; the fermentate had a pH of about 4.5 and a total acid of about 1.2 percent.

The emulsion was prepared by blending water and AMP8000 in a Breddo at about 130 to about 150° F. Subsequently, concentrated milk fat was added and blended for an additional three minutes. The coarse emulsion was formed using a valve homogenizer at 3000 psi.

The cream cheese product was prepared by blending 47.5 lbs of non-fat culture mixture in a suitable mixer (e.g., Breddo) for about three minutes. The emulsion (62.9 lbs) was then added and mixing continued for an additional about 3 minutes. The resulting mixture was transferred to a suitable container (e.g., Groen kettle) and heated to about 178° F. for about 5 minutes. A portion (92 lbs) was transferred to a suitable mixer (e.g., Breddo), mixed with the dry salt/gum mixture for about 3 minutes, and then homogenized at about 3000 psi.

The homogenized mixture, which contained about 6 percent less moisture than the target moisture level, was then heated to about 190° F. Once the temperature reaches about 185° F., 15 lbs water was added with mixing to achieve the desired moisture target level. Once the temperature reached 190° F., the temperature was held at that temperature for about 60 minutes. The resulting cream cheese can be packaged as desired and then cooled to about 40° F.

Figure 2:
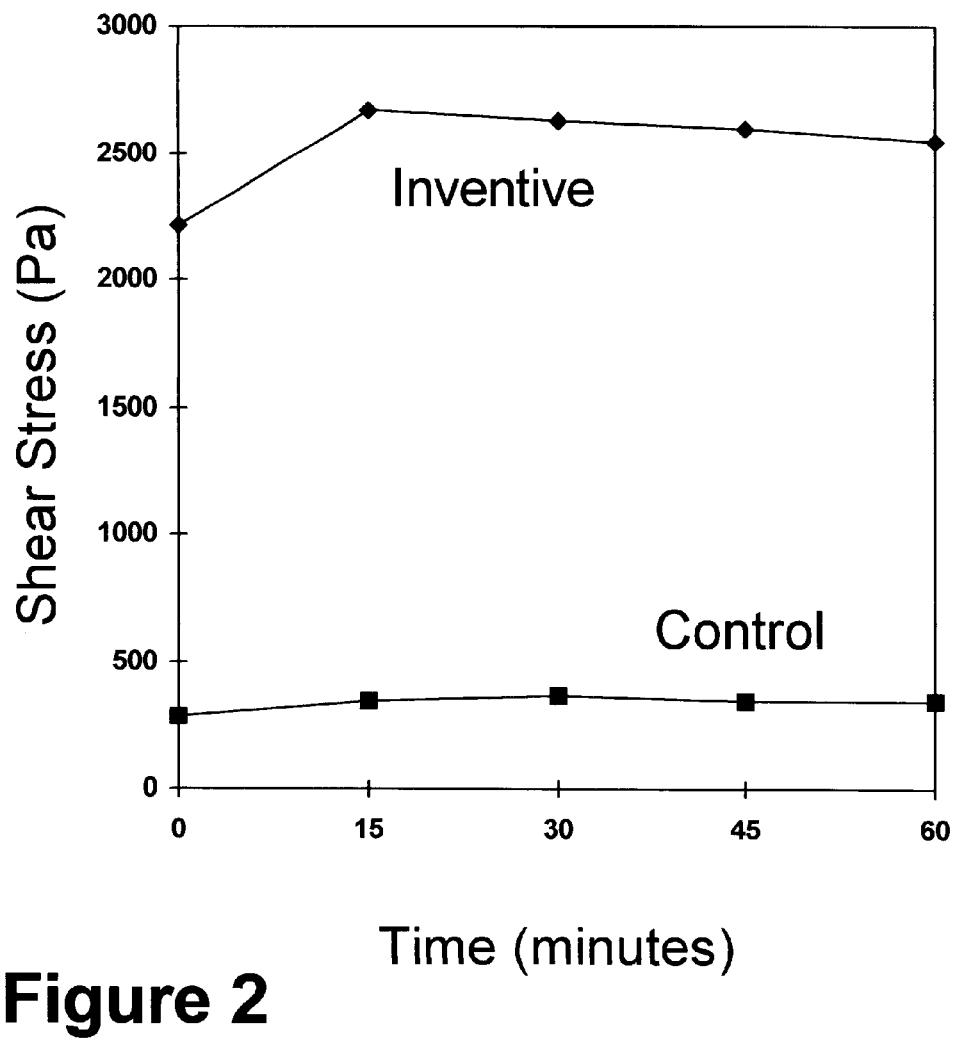
FIG. 2 provides a graph illustrating the firmness of the high moisture cream cheese prepared by the process of the present invention as compared to a control cream cheese.

The viscosity of the resulting cream cheese was measured as a function of time after cooling. The results are shown in FIG. 2 as the "inventive" sample.

Example 2

A similar cream cheese ("control") was essentially as detailed in Example 1 except that the moisture content of the emulsion was increased to achieve the final moisture target level. In other words, no additional water was required to be added to the non-fat culture mixture, emulsion, and salt/gum mixture blend to achieve the target moisture level. The following formulations were used:

| Ingredient | Weight (lbs) |
|---|---|
| Non-fat culture mixture: | |
| Water | 92.5 |
| NFDM | 4.2 |
| Alapro 4700 | 7.3 |
| AMP8000 | 2.5 |
| Emulsion: | |
| Concentrated Milk Fat | 40.6 |
| AMP8000 | 4.5 |
| Water | 39.5 |
| Salt/Gum Mixture: | |
| Salt | 0.80 |
| Carob | 0.34 |

The non-fat culture mixture and the emulsion were prepared as described in Example 1 using the above formulations. The control cream cheese was prepared by blending 51.0 lbs. of the non-fat culture mixture in a Breddo mixer for three minutes. The emulsion (66 lbs) was added and mixed an addition 3 minutes. The resulting mixture was transferred to a suitable container (e.g., Groen kettle) and heated to about 178° F. for about 5 minutes. A portion (114 lbs) was transferred to a suitable mixer (e.g., Breddo), mixed with the dry salt/gum mixture for about 3 minutes, and then homogenized at about 3000 psi.

The homogenized mixture, which contained sufficient water to achieve the desired target moisture level without any further water, was then heated to about 190° F., held at that temperature for about 60 minutes, packaged, and then cooled to about 40° F.

The viscosity of the resulting control cream cheese was measured as a function of time after cooling as in Example 1. The results for the control cream cheese sample are shown in FIG. 2 as the "control" sample.

Comparison of the viscosity of both the inventive and control samples (as prepared in Examples 1 and 2 and illustrated in FIG. 2) clearly shows that the process of this invention provides significant texture control and significantly increased firmness.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A process for the production of high moisture cream cheese having a predetermined target moisture content, said process comprising:

blending a non-fat cultured mix component having a casein to whey ratio of less than about 75:25, an emulsion component, and a salt/gum component at a temperature of about 130 to about 150° F. for about 5 to about 10 minutes to form a blend, wherein the blend has a moisture content less than the predetermined target moisture content;

homogenizing the blend at a temperature of about 130 to about 150° F. at about 500 to about 4000 psi to form a homogenized blend, wherein the homogenized blend has a moisture content less than the predetermined target moisture content; and blending additional water with the homogenized blend to raise the moisture content to the predetermined target moisture level, thereby providing the high moisture cream cheese, wherein the high moisture cream cheese has a significantly higher firmness than a standard cream cheese produced in a similar process but wherein the blend or the homogenized blend have moisture levels approaching or equal to the predetermined target moisture content.

2. The process according to claim 1, wherein the homogenized blend, prior to being blended with the additional water, has a moisture content of about 2 to about 6 percent lower than the predetermined target moisture level.

3. The process according to claim 1, wherein the significantly higher firmness of the high moisture cream cheese is about 5 to about 20 fold greater than the standard cream cheese.

4. The process according to claim 2, wherein the significantly higher firmness of the high moisture cream cheese is at least about 5 to about 20 fold greater than the standard cream cheese.

5. The process according to claim 1, wherein the non-fat cultured mix component is prepared by a process comprising:
   (1) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of about 40:60 to about 75:25;
   (2) pasteurizing the substrate;
   (3) cooling the pasteurized substrate to a temperature of about 70 to about 74° F.; and
   (4) culturing the cooled pasteurized substrate with a cream cheese culture at a temperature of about 65 to about 85° F. for about 10 to about 20 hours to achieve a pH of about 4.4 to 4.9 to obtain the non-fat cultured mix component;
wherein the emulsion component is prepared by a process comprising:
   (1) blending whey protein concentrate with water to form a whey protein concentrate and water blend;
   (2) adding a melted fat to the whey protein concentrate and water blend to form a melted fat, whey protein concentrate, and water blend containing about 4 to about 6 percent whey protein concentrate, about 45 to about 55 percent fat, and about 45 to about 55 percent water;
   (3) treating the melted fat, whey protein concentrate, and water blend under low shear conditions to form a coarse emulsion with a mean fat droplet diameter of about 5 to about 20 microns; and
   (4) treating the coarse emulsion under high shear to form a second emulsion with a mean fat droplet diameter of about 1 to about 5 microns, wherein the second emulsion is the emulsion component; and
wherein the salt/gum component comprises a dry mix of about 60 to about 80 percent salt and about 20 to about 40 percent gum; and wherein the salt/gum component is at a temperature of about 130 to about 180° F. when blended with the non-fat cultured mix component and the emulsion component.

6. The process according to claim 2, wherein the non-fat cultured mix component is prepared by a process comprising:
   (1) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of about 40:60 to about 75:25;
   (2) pasteurizing the substrate;
   (3) cooling the pasteurized substrate to a temperature of about 70 to about 74° F.; and
   (4) culturing the cooled pasteurized substrate with a cream cheese culture at a temperature of about 65 to about 85° F. for about 10 to about 20 hours to achieve a pH of about 4.4 to 4.9 to obtain the non-fat cultured mix component;
wherein the emulsion component is prepared by a process comprising:
   (1) blending whey protein concentrate with water to form a whey protein concentrate and water blend;
   (2) adding a melted fat to the whey protein concentrate and water blend to form a melted fat, whey protein concentrate, and water blend containing about 4 to about 6 percent whey protein concentrate, about 45 to about 55 percent fat, and about 45 to about 55 percent water;
   (3) treating the melted fat, whey protein concentrate, and water blend under low shear conditions to form a coarse emulsion with a mean fat droplet diameter of about 5 to about 20 microns; and
   (4) treating the coarse emulsion under high shear to form a second emulsion with a mean fat droplet diameter of about 1 to about 5 microns, wherein the second emulsion is the emulsion component; and
wherein the salt/gum component comprises a dry mix of about 60 to about 80 percent salt and about 20 to about 40 percent gum; and wherein the salt/gum component is at a temperature of about 130 to about 180° F. when blended with the non-fat cultured mix component and the emulsion component.

7. A process for the production of high moisture cream cheese having a predetermined target moisture content, said process comprising:
   (1) preparing a non-fat cultured mix component by a process comprising:
      (A) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of less than about 75 to 25;
      (B) pasteurizing the substrate;
      (C) cooling the pasturized substrate to a temperature of about 70 to about 80° F.; and
      (D) culturing the cooled pasturized substrate with a cream cheese culture at a temperature of about 65 to about 85° F. for about 10 to about 20 hours to achieve a pH of about 4.4 to 4.9 to obtain the non-fat cultured mix component;
   (2) preparing an emulsion component by a process comprising:
      (A) blending whey protein concentrate with water to form a whey protein concentrate and water blend;
      (B) adding a melted fat to the whey protein concentrate and water blend to form a melted fat, whey protein concentrate, and water blend containing about 4 to about 6 percent whey protein concentrate, about 45 to about 55 percent fat, and about 45 to about 50 percent water;
      (C) treating the melted fat, whey protein concentrate, and water blend under low shear conditions to form a coarse emulsion with a mean fat droplet diameter of about 5 to about 20 microns; and (D) treating the coarse emulsion under high shear to form a second emulsion with a mean fat droplet diameter of about 1 to about 5 microns, wherein the second emulsion is the emulsion component;

(3) preparing a salt/gum component comprising dry mix of about 60 to about 80 percent salt and about 20 to about 40 percent gum;

(4) blending the non-fat cultured mix component, the emulsion component, and the salt/gum component at a temperature of about 140 to about 180° F. for about 1 to about 10 minutes to form a blend, wherein the blend has a moisture content less than the predetermined target moisture content;

homogenizing the blend at a temperature of about 130 to about 180° F. at about 1000 to about 4000 psi to form a homogenized blend, wherein the homogenized blend has a moisture content less than the predetermined target moisture content; and blending additional water with the homogenized blend to raise the moisture content to the predetermined target moisture level, thereby providing the high moisture cream cheese, wherein the high moisture cream cheese has a significantly higher firmness than a standard cream cheese produced in a similar process but wherein the blend or the homogenized blend have moisture levels approaching or equal to the predetermined target moisture content.

8. The process according to claim 7, wherein the homogenized blend, prior to being blended with the additional water, has a moisture content of about 2 to about 6 percent lower than the predetermined target moisture level.

9. The process according to claim 7, wherein the significantly higher firmness of the high moisture cream cheese is about 5 to about 20 fold greater than the standard cream cheese.

10. The process according to claim 8, wherein the significantly higher firmness of the high moisture cream cheese is about 5 to about 20 fold greater than the standard cream cheese.

11. A high moisture cream cheese having a predetermined target moisture content, said high moisture cream cheese be prepared by a process comprising:

blending a non-fat cultured mix component having a casein to whey ratio of less than about 75:25, an emulsion component, and a salt/gum component at a temperature of about 130 to about 150° F. for about 5 to about 10 minutes to form a blend, wherein the blend has a moisture content less than the predetermined target moisture content;

homogenizing the blend at a temperature of about 130 to about 150° F. at about 500 to about 4000 psi to form a homogenized blend, wherein the homogenized blend has a moisture content less than the predetermined target moisture content; and blending additional water with the homogenized blend to raise the moisture content to the predetermined target moisture level, thereby providing the high moisture cream cheese, wherein the high moisture cream cheese has a significantly higher firmness than a standard cream cheese produced in a similar process but wherein the blend or the homogenized blend have moisture levels approaching or equal to the predetermined target moisture content.

12. The high moisture cream cheese according to claim 11, wherein the homogenized blend, prior to being blended with the additional water, has a moisture content of about 2 to about 6 percent lower than the predetermined target moisture level.

13. The high moisture cream cheese according to claim 11, wherein the significantly higher firmness of the high moisture cream cheese is about 5 to about 20 fold greater than the standard cream cheese.

14. The high moisture cream cheese according to claim 12, wherein the significantly higher firmness of the high moisture cream cheese is at least about 5 to about 20 fold greater than the standard cream cheese.

15. The high moisture cream cheese according to claim 11, wherein the non-fat cultured mix component is prepared by a process comprising:

(1) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of about 40:60 to about 75:25;

(2) pasteurizing the substrate;

(3) cooling the pasteurized substrate to a temperature of about 70 to about 74° F.; and (4) culturing the cooled pasteurized substrate with a cream cheese culture at a temperature of about 65 to about 85° F. for about 10 to about 20 hours to achieve a pH of about 4.4 to 4.9 to obtain the non-fat cultured mix component;

wherein the emulsion component is prepared by a process comprising:

(1) blending whey protein concentrate with water to form a whey protein concentrate and water blend;

(2) adding a melted fat to the whey protein concentrate and water blend to form a melted fat, whey protein concentrate, and water blend containing about 4 to about 6 percent whey protein concentrate, about 45 to about 55 percent fat, and about 45 to about 55 percent water;

(3) treating the melted fat, whey protein concentrate, and water blend under low shear conditions to form a coarse emulsion with a mean fat droplet diameter of about 5 to about 20 microns; and (4) treating the coarse emulsion under high shear to form a second emulsion with a mean fat droplet diameter of about 1 to about 5 microns, wherein the second emulsion is the emulsion component; and wherein the salt/gum component comprises a dry mix of about 60 to about 80 percent salt and about 20 to about 40 percent gum; and wherein the salt/gum component is at a temperature of about 130 to about 180° F. when blended with the non-fat cultured mix component and the emulsion component.

16. The high moisture cream cheese according to claim 12, wherein the non-fat cultured mix component is prepared by a process comprising:

(1) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of about 40:60 to about 75:25;

(2) pasteurizing the substrate;

(3) cooling the pasteurized substrate to a temperature of about 70 to about 74° F.; and (4) culturing the cooled pasteurized substrate with a cream cheese culture at a temperature of about 65 to about 85° F. for about 10 to about 20 hours to achieve a pH of about 4.4 to 4.9 to obtain the non-fat cultured mix component;

wherein the emulsion component is prepared by a process comprising:
   (1) blending whey protein concentrate with water to form a whey protein concentrate and water blend;
   (2) adding a melted fat to the whey protein concentrate and water blend to form a melted fat, whey protein concentrate, and water blend containing about 4 to about 6 percent whey protein concentrate, about 45 to about 55 percent fat, and about 45 to about 55 percent water;
   (3) treating the melted fat, whey protein concentrate, and water blend under low shear conditions to form a coarse emulsion with a mean fat droplet diameter of about 5 to about 20 microns; and
   (4) treating the coarse emulsion under high shear to form a second emulsion with a mean fat droplet diameter of about 1 to about 5 microns, wherein the second emulsion is the emulsion component; and
wherein the salt/gum component comprises a dry mix of about 60 to about 80 salt and about 20 to about 40 gum; and wherein the salt/gum component is at a temperature of about 130 to about 180° F. when blended with the non-fat cultured mix component and the emulsion component.

17. A high moisture cream cheese for the production of high moisture cream cheese having a predetermined target moisture content, said process comprising:
   (1) preparing a non-fat cultured mix component by a process comprising:
      (A) preparing a substrate comprising 0 to about 4 percent non-fat dry milk, about 6 to about 9 percent milk protein concentrate, about 1 to about 4 percent whey protein substrate, and about 80 to about 90 percent water, wherein the substrate has a casein to whey ratio of less than about 75 to 25;
      (B) pasteurizing the substrate;
      (C) cooling the pasteurized substrate to a temperature of about 70 to about 80° F.; and
      (D) culturing the cooled pasteurized substrate with a cream cheese culture at a temperature of about 65 to about 85° F. for about 10 to about 20 hours to achieve a pH of about 4.4 to 4.9 to obtain the non-fat cultured mix component;
   (2) preparing an emulsion component by a process comprising:
      (A) blending whey protein concentrate with water to form a whey protein concentrate and water blend;
      (B) adding a melted fat to the whey protein concentrate and water blend to form a melted fat, whey protein concentrate, and water blend containing about 4 to about 6 percent whey protein concentrate, about 45 to about 55 percent fat, and about 45 to about 50 percent water;
      (C) treating the melted fat, whey protein concentrate, and water blend under low shear conditions to form a coarse emulsion with a mean fat droplet diameter of about 5 to about 20 microns; and
      (D) treating the coarse emulsion under high shear to form a second emulsion with a mean fat droplet diameter of about 1 to about 5 microns, wherein the second emulsion is the emulsion component;
   (3) preparing a salt/gum component comprising dry mix of about 60 to about 80 percent salt and about 20 to about 40 percent gum;
   (4) blending the non-fat cultured mix component, the emulsion component, and the salt/gum component at a temperature of about 140 to about 180° F. for about 1 to about 10 minutes to form a blend, wherein the blend has a moisture content less than the predetermined target moisture content;
   homogenizing the blend at a temperature of about 130 to about 180° F. at about 1000 to about 4000 psi to form a homogenized blend, wherein the homogenized blend has a moisture content less than the predetermined target moisture content; and
   blending additional water with the homogenized blend to raise the moisture content to the predetermined target moisture level, thereby providing the high moisture cream cheese,
   wherein the high moisture cream cheese has a significantly higher firmness than a standard cream cheese produced in a similar process but wherein the blend or the homogenized blend have moisture levels approaching or equal to the predetermined target moisture content.

18. The high moisture cream cheese according to claim 17, wherein the homogenized blend, prior to being blended with the additional water, has a moisture content of about 2 to about 6 percent lower than the predetermined target moisture level.

19. The high moisture cream cheese according to claim 17, wherein the significantly higher firmness of the high moisture cream cheese is about 5 to about 20 fold greater than the standard cream cheese.

20. The high moisture cream cheese according to claim 18, wherein the significantly higher firmness of the high moisture cream cheese is about 5 to about 20 fold greater than the standard cream cheese.

* * * * *